US010691655B2

(12) United States Patent
Le et al.

(10) Patent No.: US 10,691,655 B2
(45) Date of Patent: Jun. 23, 2020

(54) GENERATING TABLES BASED UPON DATA EXTRACTED FROM TREE-STRUCTURED DOCUMENTS

(71) Applicant: Microsoft Technology Licensing, LLC, Redmond, WA (US)

(72) Inventors: Vu Minh Le, Kirkland, WA (US); Sumit Gulwani, Sammamish, WA (US); Ranvijay Kumar, Sammamish, WA (US); Chiu Ying Cheung, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 652 days.

(21) Appl. No.: 15/299,312

(22) Filed: Oct. 20, 2016

(65) Prior Publication Data

US 2018/0113887 A1 Apr. 26, 2018

(51) Int. Cl.
*G06F 16/25* (2019.01)
*G06F 16/215* (2019.01)
*G06F 16/83* (2019.01)
*G06F 16/22* (2019.01)

(52) U.S. Cl.
CPC ........ *G06F 16/215* (2019.01); *G06F 16/2282* (2019.01); *G06F 16/258* (2019.01); *G06F 16/83* (2019.01)

(58) Field of Classification Search
CPC .................................................. G06F 16/258
See application file for complete search history.

(56) References Cited

U.S. PATENT DOCUMENTS

| 6,381,580 | B1 | 4/2002 | Levinson |
| 6,611,843 | B1 | 8/2003 | Jacobs |
| 7,072,896 | B2 | 7/2006 | Lee et al. |
| 7,136,868 | B2 | 11/2006 | Sonkin et al. |
| 7,698,634 | B2 | 4/2010 | Bhatia et al. |
| 8,639,727 | B2 | 1/2014 | Hui et al. |
| 8,732,178 | B2* | 5/2014 | Holmes ............... G06F 17/2247 707/755 |
| 2007/0067397 | A1* | 3/2007 | Tran ..................... G06Q 10/107 709/206 |
| 2008/0172408 | A1 | 7/2008 | Meliksetian et al. |
| 2009/0063957 | A1 | 3/2009 | Tamiya |
| 2011/0029673 | A1 | 2/2011 | Jaisinghani |
| 2014/0040868 | A1 | 2/2014 | Gao et al. |

(Continued)

FOREIGN PATENT DOCUMENTS

WO 2014035539 A1 3/2014

OTHER PUBLICATIONS

"International Search Report and Written opinion issued in PCT Application PCT/US2017/056438", dated Jan. 26, 2018, 12 Pages.

(Continued)

*Primary Examiner* — Kris E Mackes
(74) *Attorney, Agent, or Firm* — Medley, Behrens & Lewis, LLC

(57) ABSTRACT

Various technologies pertaining to extracting data encoded in a tree-structured document and generating a table based upon the extracted data are described herein. In a first embodiment, the table is generated without requiring input from a data cleaner. In a second embodiment, the table is generated based upon examples set forth by a data cleaner.

20 Claims, 13 Drawing Sheets

(56) References Cited

U.S. PATENT DOCUMENTS

| | | |
|---|---|---|
| 2014/0324839 A1 | 10/2014 | Sayers et al. |
| 2015/0095312 A1 | 4/2015 | Gulwani et al. |
| 2015/0254530 A1 | 9/2015 | Gulwani et al. |
| 2016/0042015 A1* | 2/2016 | Landau ................ G06F 16/211 707/803 |

OTHER PUBLICATIONS

Le, et al., "SmartSynth: Synthesizing Smartphone Automation Scripts from Natural Language", In Proceeding of the 11th annual international conference on Mobile systems, applications, and services, Jun. 25, 2013, 13 pages.

Hall, Tim, "XMLTable: Convert XML Data into Rows and Columns using SQL", Retrieved on: Sep. 16, 2016 Available at: https://oracle-base.com/articles/misc/xmltable-convert-xml-data-into-rows-and-columns-using-sql.

* cited by examiner

| SEARCH | START FROM: [ EMPTY GRID ⌄ ] |

☐ TOP-LEVEL ARRAY   CONTAINS 4000 ITEMS
　☐ 3rd LEVEL OBJECT   CONTAINS 4 TO ITEMS   _402_
　　☐ SCORE   PRESENT 80% OF THE TIME
　　☐ DATE   PRESENT 90% OF THE TIME
　　☐ TYPE   PRESENT 90% OF THE TIME
　　☐ BUSINESS   CONTAINS 10 TO 16 ATTRIBUTES
　　　☐ BUSINESS_ID   PRESENT 80% OF THE TIME
　　　☐ NAME   PRESENT 100% OF THE TIME
　　　☐ ADDRESS   PRESENT 80% OF THE TIME
　　　☐ CITY   PRESENT 80% OF THE TIME
　　　☐ POSTAL CODE   PRESENT 80% OF THE TIME
　　　☐ LATITUDE   PRESENT 30% OF THE TIME
　　　☐ LONGITUDE   PRESENT 30% OF THE TIME
　　　SHOW 8 MORE
　　　☐ OWNER-ZIP   PRESENT 80% OF THE TIME
　　☐ VIOLATIONS   CONTAINS 3 ITEMS
　　　☐ 5th LEVEL OBJECT
　　　　☐ VIOLATION_ID   PRESENT 100% OF THE TIME
　　　　☐ RISK   PRESENT 100% OF THE TIME
　　　　☐ DESC   PRESENT 100% OF THE TIME

_404_

SEARCH    START FROM:

402        404        EMPTY GRID ⌄

☐ TOP-LEVEL ARRAY    CONTAINS 4000 ITEMS

EMPTY GRID
SUGGESTION 1
SUGGESTION 2
SUGGESTION 3
— 502

☐ 3rd LEVEL OBJECT    CONTAINS 4 TO ITEMS
  ☐ [SCORE]    PRESENT 80% OF THE TIME
  ☐ [DATE]    PRESENT 90% OF THE TIME
  ☐ [TYPE]    PRESENT 90% OF THE TIME
  ☐ [BUSINESS]    CONTAINS 10 TO 16 ATTRIBUTES
    ☐ [BUSINESS_ID]    PRESENT 80% OF THE TIME
    ☐ [NAME]    PRESENT 100% OF THE TIME
    ☐ [ADDRESS]    PRESENT 80% OF THE TIME
    ☐ [CITY]    PRESENT 80% OF THE TIME
    ☐ [POSTAL_CODE]    PRESENT 80% OF THE TIME
    ☐ [LATITUDE]    PRESENT 30% OF THE TIME
    ☐ [LONGITUDE]    PRESENT 30% OF THE TIME
    ☐ [OWNER-ZIP]    PRESENT 80% OF THE TIME
    SHOW 8 MORE
  ☐ [VIOLATIONS]    
    ☐ [5th LEVEL OBJECT]    CONTAINS 3 ITEMS
      ☐ [VIOLATION_ID]    PRESENT 100% OF THE TIME
      ☐ [RISK]    PRESENT 100% OF THE TIME
      ☐ [DESC]    PRESENT 100% OF THE TIME

START FROM: [ SUGGESTION 1 ▽ ]

[ SEARCH ]

TOP-LEVEL ARRAY    CONTAINS 4000 ITEMS
  3rd LEVEL OBJECT    CONTAINS 4 TO ITEMS    _402_
    ☒ SCORE        PRESENT 80% OF THE TIME
    ☒ DATE         PRESENT 90% OF THE TIME
    ☒ TYPE         PRESENT 90% OF THE TIME
    ☐ BUSINESS     CONTAINS 10 TO 16 ATTRIBUTES
        ☐ BUSINESS_ID   PRESENT 80% OF THE TIME
        ☐ NAME          PRESENT 100% OF THE TIME
        ☐ ADDRESS       PRESENT 80% OF THE TIME
        ☐ CITY          PRESENT 80% OF THE TIME
        ☐ POSTAL_CODE   PRESENT 80% OF THE TIME
        ☐ LATITUDE      PRESENT 30% OF THE TIME
        ☐ LONGITUDE     PRESENT 30% OF THE TIME
        ☐ OWNER-ZIP     PRESENT 80% OF THE TIME
        SHOW 8 MORE
    ☐ VIOLATIONS
        5th LEVEL OBJECT   CONTAINS 3 ITEMS
        ☐ VIOLATION_ID    PRESENT 100% OF THE TIME
        ☐ RISK            PRESENT 100% OF THE TIME
        ☐ DESC            PRESENT 100% OF THE TIME

| SCORE | DATE | TYPE |
|-------|------|------|
| 79    | 79   | 79   |
| 79    | 79   | 79   |
| 98    | 98   | 98   |
|       |      |      |
|       |      |      |
| 98    | 98   | 98   |
| 65    | 65   | 65   |
| 65    | 65   | 65   |
| 65    | 65   | 65   |
| 65    | 65   | 65   |
| 98    | 98   | 98   |
| 90    | 90   | 90   |
| 90    | 90   | 90   |

SEARCH  START FROM: SUGGESTION 1

402

■ TOP-LEVEL ARRAY  CONTAINS 4000 ITEMS
  ■ 3rd LEVEL OBJECT  CONTAINS 4 TO ITEMS
    ☒ [SCORE]  PRESENT 80% OF THE TIME
    ☒ [DATE]  PRESENT 90% OF THE TIME
    ☒ [TYPE]  PRESENT 90% OF THE TIME
    ■ [BUSINESS]  CONTAINS 10 TO 16 ATTRIBUTES
      ☒ [BUSINESS_ID]  PRESENT 80% OF THE TIME
      ☐ [NAME]  PRESENT 100% OF THE TIME
      ☐ [ADDRESS]  PRESENT 80% OF THE TIME
      ☐ [CITY]  PRESENT 80% OF THE TIME
      ☐ [POSTAL_CODE]  PRESENT 80% OF THE TIME
      ☐ [LATITUDE]  PRESENT 30% OF THE TIME
      ☐ [LONGITUDE]  PRESENT 30% OF THE TIME
      ☐ [OWNER-ZIP]  PRESENT 80% OF THE TIME
      SHOW 8 MORE
    ☐ [VIOLATIONS]
      ■ 5th LEVEL OBJECT  CONTAINS 3 ITEMS
        ☐ [VIOLATION_ID]  PRESENT 100% OF THE TIME
        ☐ [RISK]  PRESENT 100% OF THE TIME
        ☐ [DESC]  PRESENT 100% OF THE TIME

404

| BUSINESS_ID | SCORE | TYPE | TYPE |
|---|---|---|---|
| 564356 | 79 | 79 | 79 |
| 543234 | 79 | 79 | 79 |
| 126523 | 98 | 98 | 98 |
|  |  |  |  |
|  |  |  |  |
| 285435 | 98 | 98 | 98 |
| 898312 | 65 | 65 | 65 |
| 215432 | 65 | 65 | 65 |
| 434211 | 65 | 65 | 65 |
| 678343 | 65 | 65 | 65 |
| 212349 | 65 | 65 | 65 |
| 198433 | 98 | 98 | 98 |
| 983245 | 90 | 90 | 90 |
| 234543 | 90 | 90 | 90 |

700

| | SEARCH | | START FROM: | SUGGESTION 1 ⌄ |
|---|---|---|---|---|

■ TOP-LEVEL ARRAY   CONTAINS 4000 ITEMS
  ■ 3rd LEVEL OBJECT   CONTAINS 4 TO ITEMS   402
    ☒ [SCORE]   PRESENT 80% OF THE TIME
    ☒ [DATE]    PRESENT 90% OF THE TIME
    ☒ [TYPE]    PRESENT 90% OF THE TIME
    ■ [BUSINESS] CONTAINS 10 TO 16 ATTRIBUTES
      ☒ [BUSINESS_ID] PRESENT 100% OF THE TIME
      ☐ [NAME]    PRESENT 100% OF THE TIME
      ☐ [ADDRESS] PRESENT 80% OF THE TIME
      ☐ [CITY]    PRESENT 80% OF THE TIME
      ☐ [POSTAL_CODE] PRESENT 80% OF THE TIME
      ☐ [LATITUDE] PRESENT 30% OF THE TIME
      ☐ [LONGITUDE] PRESENT 30% OF THE TIME
      ☐ [OWNER-ZIP] PRESENT 80% OF THE TIME
      SHOW 8 MORE
    ☐ [VIOLATIONS]
      ■ 5th LEVEL OBJECT   CONTAINS 3 ITEMS
        ☐ [VIOLATION_ID] PRESENT 100% OF THE TIME
        ☐ [RISK]   PRESENT 100% OF THE TIME
        ☐ [DESC]   PRESENT 100% OF THE TIME

| BUSINESS_ID | SCORE | TYPE | TYPE |
|---|---|---|---|
| 564356 | 79 | 79 | 79 |
| 543234 | 79 | 79 | 79 |
| 126523 | 98 | 98 | 98 |
| VIOLATIONS | | | |
| 285435 | 98 | 98 | 98 |
| 898312 | 65 | 65 | 65 |
| 215432 | 65 | 65 | 65 |
| 434211 | 65 | 65 | 65 |
| 678343 | 65 | 65 | 65 |
| 212349 | 65 | 65 | 65 |
| 198433 | 98 | 98 | 98 |
| 983245 | 90 | 90 | 90 |
| 234543 | 90 | 90 | 90 |

| | | START FROM: | SUGGESTION 1 ⌄ |

SEARCH

TOP-LEVEL ARRAY ☐ CONTAINS 4000 ITEMS
3rd LEVEL OBJECT ☐ CONTAINS 4 TO ITEMS  402
☒ SCORE PRESENT 80% OF THE TIME
☒ DATE PRESENT 90% OF THE TIME
☒ TYPE PRESENT 90% OF THE TIME
■ BUSINESS CONTAINS 10 TO 16 ATTRIBUTES
  ☒ BUSINESS_ID PRESENT 80% OF THE TIME
  ☐ NAME PRESENT 100% OF THE TIME
  ☐ ADDRESS PRESENT 80% OF THE TIME
  ☐ CITY PRESENT 80% OF THE TIME
  ☐ POSTAL CODE PRESENT 80% OF THE TIME
  ☐ LATITUDE PRESENT 30% OF THE TIME
  ☐ LONGITUDE PRESENT 30% OF THE TIME
  SHOW 8 MORE
  ☐ OWNER-ZIP PRESENT 80% OF THE TIME
☐ VIOLATIONS
  5th LEVEL OBJECT CONTAINS 3 ITEMS
  ☐ VIOLATION_ID PRESENT 100% OF THE TIME
  ☐ RISK PRESENT 100% OF THE TIME
  ☐ DESC PRESENT 100% OF THE TIME

| BUSINESS_ID | SCORE | TYPE | TYPE |
|---|---|---|---|
| 564356 | 79 | 79 | 79 |
| 543234 | 79 | 79 | 79 |
| 126523 | 98 | 98 | 98 |
| | | VIOLATIONS | |
| 285435 | 98 | 98 | 98 |
| 898312 | 65 | 65 | 65 |
| 215432 | 65 | 65 | 65 |
| 434211 | 65 | 65 | 65 |
| 678343 | 65 | 65 | 65 |
| 212349 | 65 | 65 | 65 |
| 198433 | 98 | 98 | 98 |
| 983245 | 90 | 90 | 90 |
| 234543 | 90 | 90 | 90 |

SEARCH    START FROM: SUGGESTION 1 ▽

■ TOP-LEVEL ARRAY    CONTAINS 4000 ITEMS
■ 3rd LEVEL OBJECT   CONTAINS 4 TO ITEMS    402
☒ [SCORE]  PRESENT 80% OF THE TIME
☒ [DATE]   PRESENT 90% OF THE TIME
☒ [TYPE]   PRESENT 90% OF THE TIME
■ [BUSINESS] CONTAINS 10 TO 16 ATTRIBUTES
  ☒ [BUSINESS_ID] PRESENT 80% OF THE TIME
  ☐ [NAME]    PRESENT 100% OF THE TIME
  ☐ [ADDRESS] PRESENT 80% OF THE TIME
  ☐ [CITY]    PRESENT 80% OF THE TIME
  ☐ [POSTAL_CODE] PRESENT 80% OF THE TIME
  ☐ [LATITUDE]  PRESENT 30% OF THE TIME
  ☐ [LONGITUDE] PRESENT 30% OF THE TIME
  ☐ [OWNER-ZIP] PRESENT 80% OF THE TIME
  SHOW 8 MORE
☒ [VIOLATIONS]  5th LEVEL OBJECT  CONTAINS 3 ITEMS
  ☒ [VIOLATION_ID] PRESENT 100% OF THE TIME
  ☒ [RISK]  PRESENT 100% OF THE TIME
  ☐ [DESC]  PRESENT 100% OF THE TIME

| BUSINESS_ID | SCORE | TYPE | TYPE | VIOLATION_ID | RISK |
|---|---|---|---|---|---|
| 564356 | 79 | 79 | 79 | 33 | 2 |
| 543234 | 79 | 79 | 79 | 55 | 3 |
| 126523 | 98 | 98 | 98 | 34 | 9 |
|  |  |  |  |  |  |
| 285435 | 98 | 98 | 98 | 22 | 1 |
| 898312 | 65 | 65 | 65 | 15 | 4 |
| 215432 | 65 | 65 | 65 | 17 | 5 |
| 434211 | 65 | 65 | 65 | 19 | 7 |
| 678343 | 65 | 65 | 65 | 54 | 1 |
| 212349 | 65 | 65 | 65 | 29 | 3 |
| 198433 | 98 | 98 | 98 | 98 | 4 |
| 983245 | 90 | 90 | 90 | 67 | 6 |
| 234543 | 90 | 90 | 90 | 55 | 8 |

404

1000

FIG. 10

GENERATING TABLES BASED UPON DATA EXTRACTED FROM TREE-STRUCTURED DOCUMENTS

BACKGROUND

As computing devices have become ubiquitous, the volume of data produced by such computing devices has continuously increased. Organizations often wish to obtain insights about their processes, products, etc., based upon data generated by numerous data sources, wherein such data from the data sources may have different formats. To allow for these insights to be extracted from data, the data must first be "cleaned" such that a client application (such as an application that is configured to generate visualizations of the data) can consume and produce abstractions over the data.

Currently, data is often serialized into a tree-structured document, such as JSON, XML, etc. Often, an organization will employ an individual, referred to herein as a "data cleaner", to extract data encoded in tree-structured documents and place such data in a format (e.g., tabular) that can be consumed by certain applications for processing. Utilizing conventional approaches, the data cleaner can write a customized script that receives the tree-structured document as input, extracts data from the tree-structured document, and constructs a table based upon the extracted data (e.g., where at least some of the data extracted from the tree-structured document may be further processed prior to a cell in a table being populated with a value). Writing a script, particularly when the tree-structured document is not in a relatively simple format and/or when somewhat complex processing is to be undertaken on data extracted from the tree-structured document, can be cumbersome and requires programming expertise. Therefore, it can be ascertained that extracting data encoded in a tree-structured document and creating a table based upon the extracted data can be labor-intensive.

SUMMARY

The following is a brief summary of subject matter that is described in greater detail herein. This summary is not intended to be limiting as to the scope of the claims.

Described herein are various technologies pertaining to extracting data from tree-structured documents and generating tables based upon the extracted data. In a first approach for extracting data from a tree-structured document and generating a table based upon the extracted data, no input from a data cleaner is required. With more specificity, a computing device can execute a data cleaning tool, wherein the data cleaning tool loads a tree-structured document therein. Exemplary tree-structured documents include JSON documents, XML documents, and other similar documents. The data cleaning tool can be configured to ascertain a structure of the tree-structured document, and can be further configured to construct a schema based upon the structure of the tree-structured document. For instance, when ascertaining the structure of the tree-structured document, the data cleaning tool can identify a number of nodes in the tree-structured document, depths of nodes in the tree-structured document, a number of fields in records of the tree-structured document, a number of field instances in fields, whether or not field instances include records (e.g., a recursive array), and so forth. Further, the data cleaning tool can access a computer-implemented model of user behavior that indicates how one or more of the data cleaner, an end-user, previous users in a certain division of an enterprise, the general population, or some other user group have previously constructed tables based upon tree-structured documents that have similar structures to the tree-structured document loaded into the data cleaning tool.

The data cleaning tool may then select a conversion scheme from amongst a plurality of conversion schemes based upon the structure of the tree-structured document and the computer-implemented model of user behavior. Additionally or alternatively, the data cleaning tool can select the conversion scheme from amongst the plurality of conversion schemes based upon explicit input set forth by the data cleaner. Exemplary processes corresponding to a conversion scheme that can be performed by the data cleaning tool include, but are not limited to, merging field instances of different lists in the tree-structured document (where the lists have equivalent lengths and are at a same depth in the tree-structured document), taking a cross product of multiple lists in the tree-structured document (where the lists have equivalent lengths and are at a same depth in the tree-structured document), amongst other processes. Thus, the data cleaning tool extracts data from the tree-structured document and constructs a table based upon the extracted data by 1) ascertaining the structure of the tree-structured document; 2) constructing a schema based upon the structure; 3) selecting a conversion scheme (e.g., based upon previous user behavior and/or explicit input); and 4) applying the schema and the conversion scheme to the tree-structured document to generate an output table.

A second approach for extracting data encoded in a tree-structured document and generating a table based upon the extracted data involves receiving at least one example from the data cleaner pertaining to a desired output table. With more specificity, the data cleaning tool can load a tree-structured document therein. In such an example, the tree-structured document may have a relatively complex structure, or the data cleaner may wish to perform complicated extraction of data from the tree-structured document and/or complicated processing over extracted data. An exemplary complicated extraction includes extracting substrings of field instances in the tree-structured document. Exemplary complicated processing over extracted data includes combining string values from multiple fields in the tree-structured document, merging values of different field names possibly using some delimiter into a single column in an output table, etc.

In such a scenario, the data cleaning tool can receive input from the data cleaner, wherein the input describes the intent of the data cleaner by means of examples. The data cleaning tool, responsive to receipt of such examples, can construct a program that is consistent with the examples. A program is consistent with the examples when the program, upon receiving a portion of the tree-structured document that corresponds to the examples as input, will output an output table that does not violate the examples. For instance, the data cleaning tool can utilize program synthesis techniques to search a domain specific language for the program that is consistent with the examples set forth by the data cleaner. The data cleaning tool can then expose the program to the data cleaner for review and editing, if desired.

In some cases, the data cleaning tool may identify multiple programs that are consistent with the examples set forth by the data cleaner (in view of at least a portion of the tree-structured document that corresponds to the examples). In such a case, the data cleaning tool can rank the programs based on at least one ranking criterion, wherein ranking criteria include, but is not limited to, the size of the programs (e.g., smaller programs tend to be preferred over larger programs), complexity of the programs, (e.g., simple programs tend to be preferred over complex programs), etc.

Further, when the data cleaning tool determines that the examples provided by the data cleaner are ambiguous, the data cleaning tool can output prompts to the data cleaner requesting additional examples or constraints that can be used to select from among the many high-ranked programs synthesized from the underlying domain-specific language. For instance, the data cleaning tool can request that the data cleaner provide additional entries in an example table. In yet another example, the data cleaning tool can request a negative constraint from the data cleaner, in case it ends up extracting too many records/rows in the output table. Once the data cleaning tool has identified (and selected) at least one program that is consistent with the examples set forth by the data cleaner, the data cleaning tool can cause a processor to execute the program, where the program is provided with an entirety of the tree-structured document as input, and the program (based upon the input) outputs an output table.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 4-10 depict exemplary graphical user interfaces that pertain to generation of tabular data based upon a tree-structured document.

DETAILED DESCRIPTION

Figure 1:
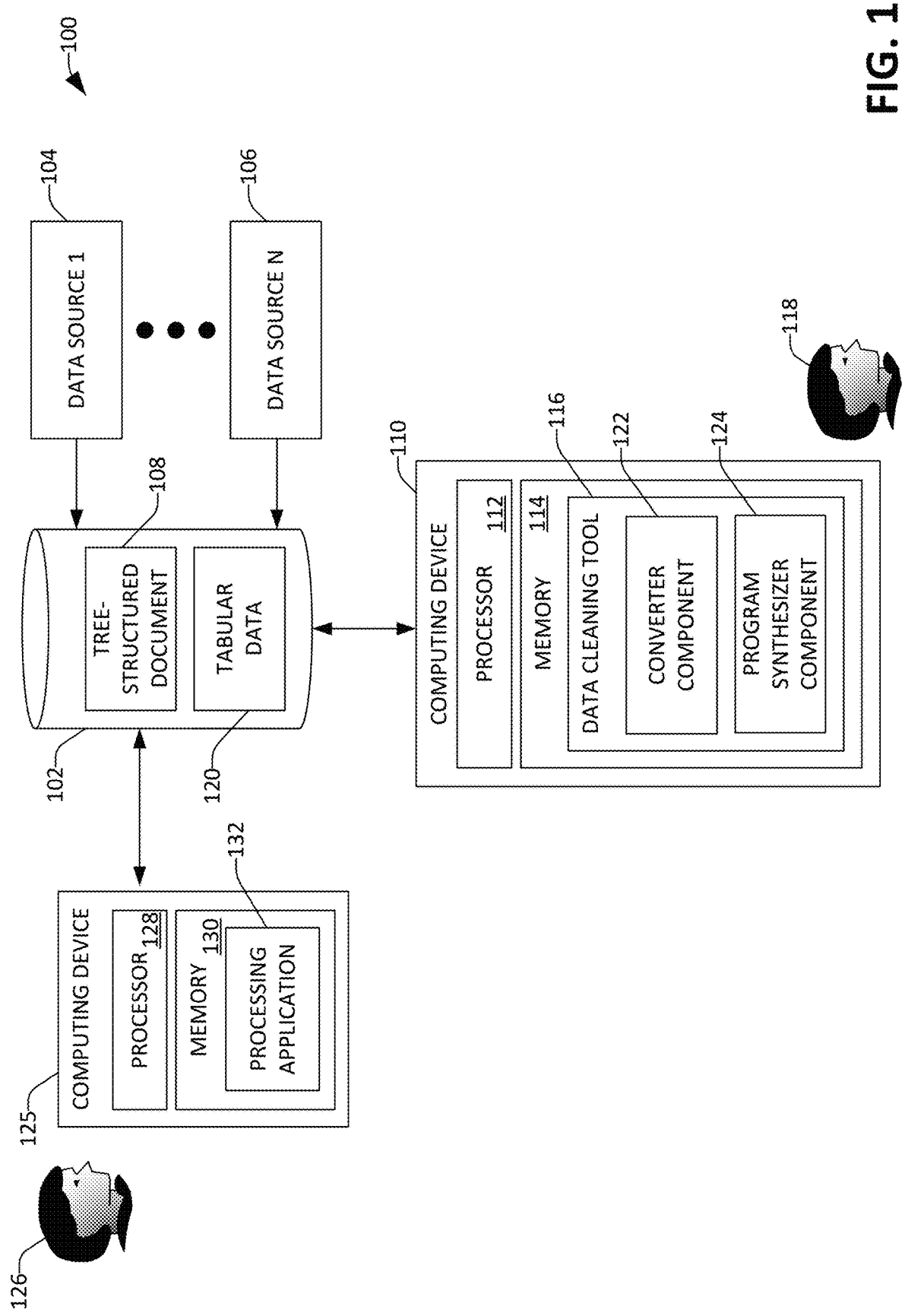
FIG. 1 is a functional block diagram of an exemplary system that is configured to extract data encoded in a tree-structured document and generate tabular data based upon the extracted data.

Various technologies pertaining to extracting data from a tree-structured document and generating a table based upon the extracted data are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to extracting data encoded in a tree-structured document and generating a table based upon this extracted data. Data is often serialized into tree-structured documents, such as JSON documents, XML documents, and some webpages. Several computer-executable applications, however, are unable to directly process tree-structured documents; instead, such applications require that data be in tabular format. Hence, described herein are technologies that facilitate extracting data from a tree-structured document and then generating a table based upon such extracted data, wherein the table includes the data extracted from the tree-structured document. Furthermore, such technologies reduce the burden on the data cleaner, as the data cleaner need not write a one-off script to extract data encoded in a tree-structured document and place the extracted data in a table.

With reference now to FIG. 1, an exemplary system 100 that facilitates extracting data encoded in a tree-structured document and generating a table based upon the extracted data is illustrated. The system 100 is described in the context of an enterprise receiving data from various data sources, it is to be understood, however, that aspects described herein are applicable to a personal computing context, where an individual user may desire to extract data from a tree-structured document and generate a table based upon the extracted data. Accordingly, the description below pertaining to the enterprise environment is not intended to limit aspects described herein to any particular context.

The system 100 includes a data store 102, wherein the data store 102 can retain data received from a plurality of data sources 104-106. For instance, the data sources 104-106 can be or include web pages, computer-executable applications, or the like. As shown, the data store 102 can include a tree-structured document 108, wherein the tree-structured document 108 is received from one of the data sources in the plurality of data sources 104-106. For example, the tree-structured document can be a JSON document, an XML document, or other suitable tree-structured (hierarchical) document. The tree-structured document 108 includes an array of records, where each record has at least one field, and the field has at least one field instance. Thus, it can be ascertained that a field can include several field instances, thereby forming a list. A length of the field indicates a number of field entities that form the list. Additionally, a field instance can include a record, which (as noted above) includes at least one field. Further, a field instance can comprise a value, wherein the value can be alphabetic, numeric, alphanumeric, etc.). In a non-limiting example, then, the tree-structured document 108 can include a record, where the record comprises two fields, and where each of the fields includes a list of field instances.

The system 100 further comprises a computing device 110 that is in communication with the data store 102. The computing device 110, while not shown, may include the data store 102, may be able to access the data store 102 by way of a network connection, etc. The computing device 110 includes a processor 112 and memory 114, wherein the memory 114 has a data cleaning tool 116 loaded therein. The data cleaning tool 116, when executed by the processor 112, can be configured to perform tasks related to discovering data, normalizing the data, correcting the data (e.g., remove null values), enriching the data, validating the data, and publishing the data for consumption by a client application. The computing device 110 is operated by a data cleaner 118 who is tasked with cleaning data for an enterprise. For example, the computing device 110 can be operated directly or indirectly by the data cleaner 118. In other words, the system 100 may also include a client computing device (not shown) that is operated by the data cleaner 118, wherein the client computing device is in communication with the computing device 110 such that actions of the computing device 110 can be based upon input received from the data cleaner 118 at the client computing device.

Generally, the data cleaning tool 116 is configured to extract data encoded in the tree-structured document 108 and generate tabular data 120 (e.g., a table that comprises columns and rows). The data cleaning tool 116 can cause the tabular data 120 to be stored in the data store 102 or other suitable data repository. The data cleaning tool 116 is configured to employ various approaches when extracting data from the tree-structured document 108 and generating the tabular data 120 based upon the data extracted from the tree-structured document 108. In a first exemplary approach, when extraction of data from the tree-structured document 108 and subsequent processing of such data, as desired by the data cleaner 118, is somewhat predictable or non-complex, the data cleaning tool 116 can extract data from the tree-structured document 108 and generate the tabular data 120 automatically and without the data cleaner 118 needing to provide examples as to the output format of the tabular data 120. In a second exemplary approach, when extraction of data from the tree-structured document 108 and generation of the tabular data 120 is more complex, or the tree-structured document 108 has a complex structure, the data cleaning tool 116 can be configured to receive examples (such as some example tuples for the intended output table from the data cleaner 118) and can construct a program that, when the tree-structured document 108 is received as input to the program, the output generated by the program is consistent with the examples provided by the data cleaner 118, e.g., the output generated by the program includes the example tuples. The data cleaning tool 116 includes a converter component 122 that is configured to perform the first approach and includes a program synthesizer component 124 that is configured to perform the second approach. Utilizing either approach, the data cleaning tool 116 is configured to output the tabular data 120 based upon the tree-structured document 108.

The system 100 further includes a client computing device 125 operated by an end-user 126. The client computing device 125 includes a processor 128 and memory 130, wherein the memory 130 has a processing application 132 loaded therein that is executed by the processor 128. In this example, the processing application 132 is unable to process the tree-structured document 108; however, the processing application 132 is able to process the tabular data 120. Accordingly, the processing application 132 can cause the tabular data 120 to be loaded into the memory 130, and the processing application 132, when executed by the processor 128, can process the tabular data 120 in accordance with input from the end-user 126.

Figure 2:
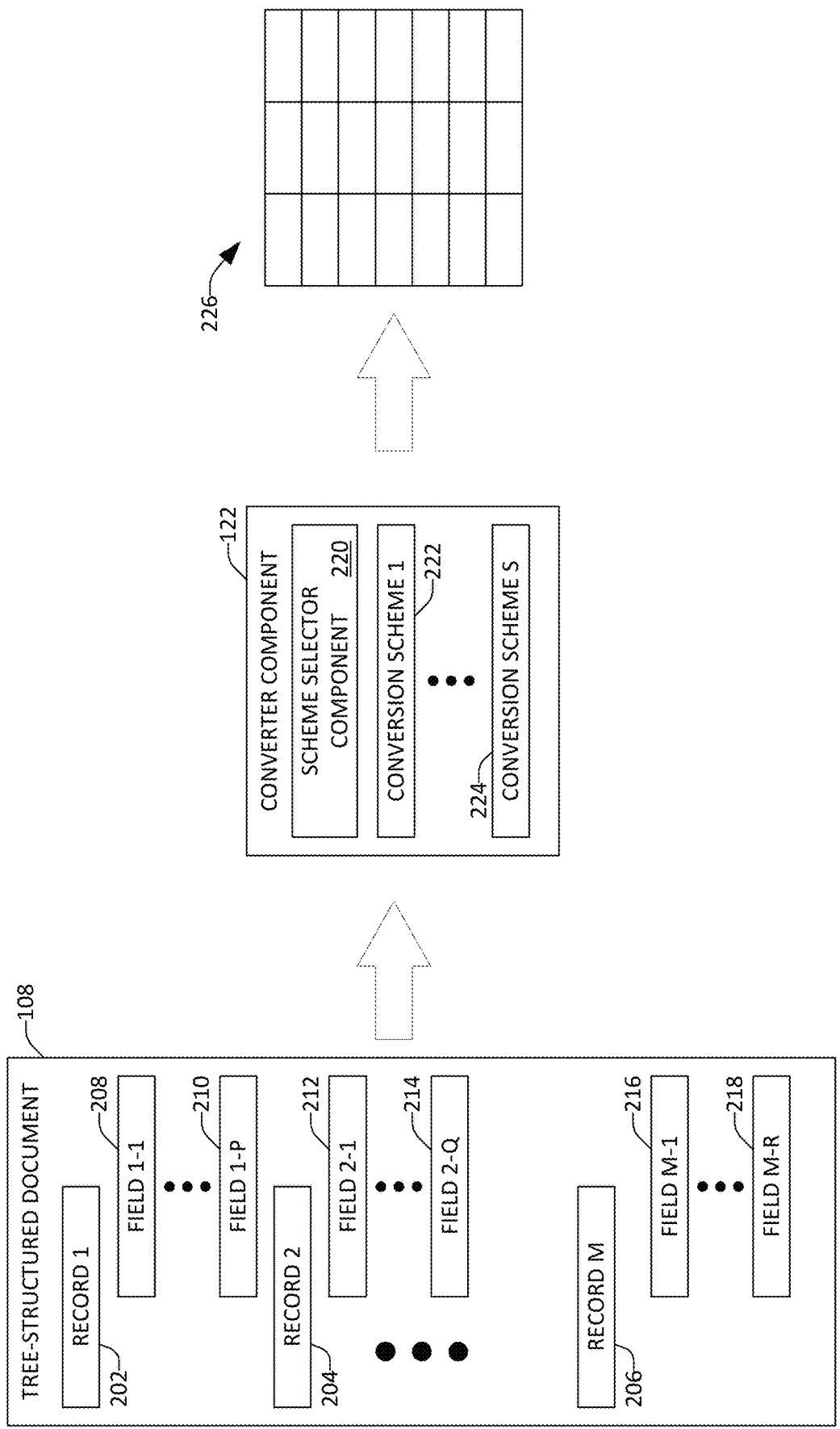
FIG. 2 is a schematic that illustrates generation of a table based upon a tree-structured document.

With reference now to FIG. 2, an exemplary schematic illustrating operation of the converter component 122 of the data cleaning tool 116 is illustrated. The tree-structured document 108 is loaded into the memory 114. In the exemplary schematic shown in FIG. 2, the tree-structured document 108 includes an array of m records 202-206. Further, the records 202-206 are depicted as including a plurality of fields. It is to be understood, however, that a record may include a single field. In the exemplary tree-structured document 108, the first record 202 includes fields 208-210, the second record 204 includes fields 212-214, and the mth record 206 includes fields 216-218. As indicated previously, one or more of the fields 208-218 can include a single field instance, while others of the fields 208-218 may include multiple field instances (e.g., a list). Further, a field can include a record, which in turn can have a plurality of fields.

The tree-structured document 108 is loaded into the memory 114, and the data cleaning tool 116 determines a structure of the tree-structured document 108. For example, the data cleaning tool 116 can identify a depth of each record and field in the tree-structured document 108 (e.g., a number of nodes from a top-level record in the tree-structured document 108 to a record), a number of records at each level in the hierarchy of the tree-structured document 108, a number of fields in each record, a length of lists in fields of the tree-structured document 108, etc. Responsive to ascertaining the structure of the tree-structured document 108, the data cleaning tool 116 can build a schema the corresponds to the tree-structured document 108. The schema can be a recursive data/type definition made up of sequence/array or struct/record constructs.

The converter component 122 includes a scheme selector component 220 that is configured to select a conversion scheme from amongst a plurality of conversion schemes 222-224 to "flatten" the schema into an output table 226. Each conversion scheme in the conversion schemes 222-224 can be a process or set of processes for extracting data from the tree-structured document 108 and constructing the output table 226 based upon the data extracted from the tree-structured document 108. In non-limiting examples, the first conversion scheme 222 can be configured to search through the records 202-206 that include fields that comprise lists, and for a record that includes several fields that comprise lists of the same length, merge items across these lists and include them in a column in the output table 226. The list merge operation involves taking a pair of lists and generating a list of pairs of matching elements from the two lists. In another example, conversion scheme s 224 can be configured to search through the tree-structured document 108 for records that have several fields comprising lists of the same length, and take cross products of such lists (where the cross product is taken from lists that belong to the same record). In yet another example, one of the conversion schemes can be configured to merge field instances of lists of identical length that are at the same level in the tree-structured document 108, regardless as to whether or not they belong to the same record. Other exemplary schemes will be readily contemplated by one skilled in the art.

As indicated previously, the scheme selector component 220 can select a conversion scheme from the plurality of conversion schemes 222-224 based upon the ascertained structure of the tree-structured document 108, as some conversion schemes will be more well-suited for tree-structured documents of certain structures than others. Additionally, the scheme selector component 220 can select a conversion scheme from amongst the plurality of conversion schemes 222-224 based upon formats of tables previously generated by the data cleaner 118 (or other users) from tree-structured documents that have a structure similar to the tree-structured document 108. Therefore, for example, if the data cleaner 118 has previously taken cross products of lists in tree-structured documents of a certain format when creating output tables, the scheme selector component 220 can select conversion scheme s 224 when the user wants to extract data from tree-structured documents of that format. Hence, it can be ascertained that a model of user behavior can be built and utilized by the converter component 122 to select a conversion scheme from a plurality of conversion schemes 222-224, wherein the converter component 122 selects the conversion scheme responsive to a tree-structured document being loaded into the memory 114 of the computing device 110. The model of user behavior can model: 1) behavior of the data cleaner 118; 2) behavior of end-users that are to consume the table 226 (e.g., such as the end-user 126); 3) behavior of users in general; 4) behavior of users in a division of an enterprise, etc. In still yet another example, the data cleaner 118 can provide manual input as to which of the conversion schemes 222-224 is to be applied to the tree-structured document 108. As shown below, a graphical user interface can include a drop-down menu, where different conversion schemes can be selected by the data cleaner 118 resulting in formation of different tables based upon the data encoded in the tree-structured document 108.

Figure 3:
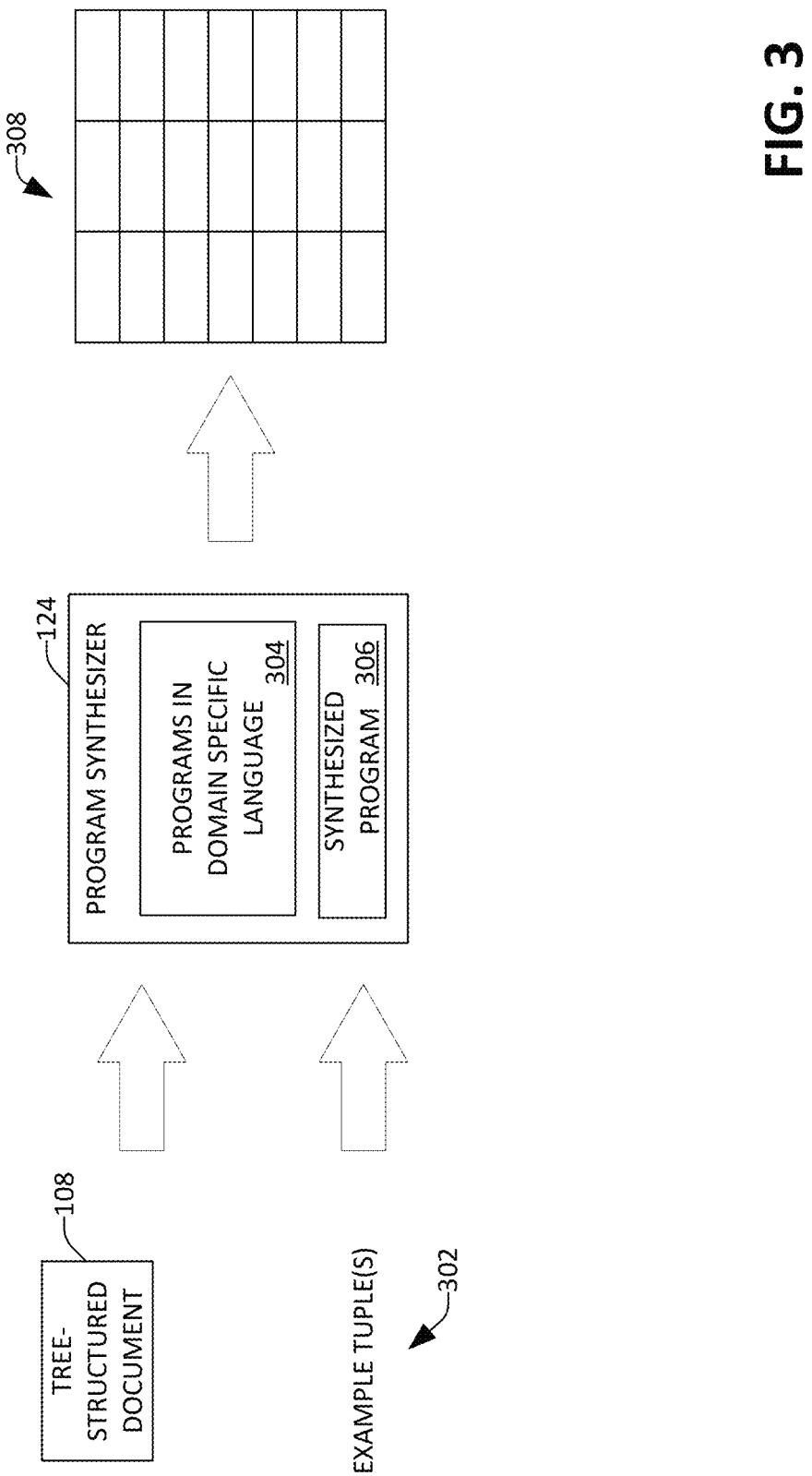
FIG. 3 is another exemplary schematic that illustrates generation of a table based upon an example table set forth by a user with respect to a tree-structured document.

Now referring to FIG. 3, an exemplary schematic depicting operation of the program synthesizer component 124 is illustrated. The program synthesizer component 124 is generally configured to construct more complicated extraction scripts than those represented by the conversion schemes 222-224 utilized by the converter component 122. For example, the data cleaner 118 may wish to extract a substring or substrings of field instances in the tree-structured document 108, or may wish to combine substrings of field instances of different records, or merge values of different field names into a same column in an output table using some delimiter. In operation, the tree-structured document 108 is loaded into the memory 114 and is accessed by the data cleaning tool 116. The data cleaner 118 can review the tree-structured document 108 and can provide examples of tuple(s) 302, where the tuples 302 are to be included in an output table. The data cleaner 118 can additionally or alternatively provide other suitable example constraints. The example tuples 302 are based upon data in a portion of the tree-structured document 108. Accordingly, the data cleaner 118 describes his or her intent by means of examples.

The program synthesizer component 124 receives one or more examples set forth by the data cleaner 118, such as the example tuples 302. Other examples may also be provided by the data cleaner 118 including, but not limited to, one or more example tuples in the output tables that correspond to data in the tree-structured document 108, one or more constraints defined by the data cleaner 118, negative examples set forth by the data cleaner 118 (e.g. "do not include substring A from field 2-1 in an output column"), and so on. Responsive to receipt of at least one example (such as the example tuples 302), and optionally responsive to receipt of an identification of a portion of the tree-structured document 108 that corresponds to the at least one example, the program synthesizer component 124 can search through programs in a domain specific language 304 and identify one or more programs that are consistent with the at least one example set forth by the data cleaner 118. In other words, the program identified by the program synthesizer component 124, when receiving the portion of the tree-structured document 108 that corresponds to the example tuples 302, will be consistent with the example tuples 302. The program synthesizer component 124 can utilize any suitable technique to search through the programs in the domain specific language 304 and identify a synthesized program 306 that is consistent with the examples set forth by the data cleaner 118. For instance, the program synthesizer component 124 can utilize program synthesis to search through the programs in the domain specific language 304 and construct the synthesized program 306.

In many cases, the program synthesizer component 124 may construct several programs that are consistent with the examples set forth by the data cleaner 118. When the program synthesizer component 124 identifies several programs that are consistent with input examples, the program synthesizer component 124 can rank the programs according to at least one ranking criterion. Exemplary ranking criteria includes, but is not limited to, a size of the program, a complexity of the program (e.g. fewer nested loops are preferred versus more nested loops), etc. Further, the program synthesizer component 124 can rank programs as a function of the model of user behavior described above. For instance, users in a domain of the end-user 126 in an enterprise may typically wish to create tables of a certain format, and one of the synthesized programs created by the program synthesizer component 124 may be consistent with both the example output table 302 and the typical format desired by users in the division of the enterprise. The program synthesizer component 124 may, thus, rank such program more highly than another program, where the another program is also consistent with the example output table 302 but may be inconsistent with previous formats.

Still further, the program synthesizer component 124 can expose the synthesized program 306 to the data cleaner 118. The synthesized program 306 may be exposed in editable form, such that the data cleaner 118 is able to review the synthesized program 306 and edit the synthesized program 306, if desired. Further, the data cleaner 118, when reviewing the synthesized program 306, can determine that the synthesized program 306 will not provide an output table as desired. In such case, the data cleaner 118 can expand upon the example tuples 302 or provide additional constraints to the program synthesizer component 124. The program synthesizer component 124 may then renew the search through the programs in the domain specific language 304 to construct new programs based upon the updated example set forth by the data cleaner 118.

Responsive to the program synthesizer component 124 constructing the synthesized program 306, the entirety of the tree-structured document 108 can be provided as input to the synthesized program 306. The synthesized program, when executed by the processor 112, extracts data from the tree-structured document 108 and generates an output table 308 that includes a plurality of columns, wherein entries in the output table 308 are based upon data extracted from the tree-structured document 108 by the synthesized program 306. When reviewing the output table 308, the data cleaner 118 may ascertain that the synthesized program 306 has extracted incorrect field instances from the tree-structured document 108. In such case, the data cleaner 118 may provide further examples to the program synthesizer component 124 (which may be negative examples indicating that a certain field instance is not be extracted from the tree-structured document 108). The program synthesizer component 124 may then re-perform the search through the programs in the domain specific language 304 and construct several programs that are consistent with the examples set forth by the data cleaner 118. Further, the program synthesizer component 124 can rank these programs and can select the most highly ranked program from amongst the ranked programs.

Now referring to FIG. 4, an exemplary graphical user interface 400 is illustrated. The graphical user interface 400 includes a first portion 402 and a second portion 404. The first portion 402 includes a representation of a tree-structured document. The representation of the tree-structured document can also include information about records, fields, and field instances, in the tree-structured document, such as a number of fields that a record includes, a percentage of fields that have certain field instances, etc. The second portion 404 of the graphical user interface 400 is configured to depict a table constructed based upon the tree-structured document represented in the first portion 402 of the graphical user interface 400.

Now referring to FIG. 5, another exemplary graphical user interface 500 is depicted. In the exemplary graphical user interface 500, a pulldown menu 502 is selected, wherein a plurality of selectable suggestions are displayed responsive to the pulldown menu 502 being selected. These suggestions correspond to the conversion schemes 222-224 described above with respect to FIG. 2. The data cleaner 118 can select a suggestion from the plurality of suggestions (e.g. "Suggestion 1"). Now referring to FIG. 6, another exemplary graphical user interface 600 is depicted, wherein the second portion 404 includes a table, and wherein entries of the table are populated with data based upon data extracted from the tree-structured document represented in the first portion 402 of the graphical user interface 600. As can be ascertained, application of the first suggestion with respect to the tree-structured document results in three fields (with field names score, date, and type) being selected in the tree-structured document, wherein the table shown in the second portion 404 includes field instances extracted from such fields.

Turning to FIG. 7, another exemplary graphical user interface 700 is illustrated showing further user interaction with the representation of the tree-structured document shown in the first portion 402. In this example, the data cleaner 118 indicates that a recursive array has been selected, and that a field in the recursive array has also been selected. This results in field instances in the selected field to be represented as a column in the table shown in the second portion 404. Accordingly, through input of the data cleaner 118, field instances from the tree-structured document represented in the first portion 402 of the graphical user interface 700 have been placed in a column in the table shown in the second portion 404 of the graphical user interface 700.

Now turning to FIG. 8, yet another exemplary graphical user interface 800 is illustrated, where user interaction with the representation of the tree-structured document shown in the first portion 402 is depicted. In this example, the data cleaner 118 can select a record from the representation of the tree-structured document shown in the first portion 402 of the graphical user interface 800, and can drag the record to a desired position in the table shown in the second portion 404 of the graphical user interface 800. For instance, the data cleaner 118 can drag the selected record such that field instances corresponding to the selected record can be shown in a column or columns at a position in the table selected by the data cleaner 118, as shown in the second portion 404 of the graphical user interface 800.

Referring to FIG. 9, an exemplary graphical user interface 900 is depicted, where the data cleaner 118 has indicated that field instances of the "violations" record are to be included in the table in the second portion 404 to the immediate to the right of a "type" column of the table. FIG. 10 depicts a graphical user interface 1000 that shows a table after the user has completed the drag-and-drop process. Other approaches for causing data in the tree-structured document shown in the first portion 402 of the graphical user interface to be converted to tabular data are also contemplated. For instance, the data cleaner 118 may set forth voice input to indicate that field instances corresponding to a certain record are to be extracted from the tree-structured document and placed in the table at a specified position or positions therein. Further, it is contemplated that the data cleaner 118 may set forth voice input as to operations that are to be undertaken on data extracted from the tree-structured document and included in the table. In a non-limiting example, the data cleaner 118 can indicate that field instances corresponding to records A and B are to be merged and placed after a column with the title "date". Natural language processing techniques can be employed to ascertain the intent of the data cleaner 118, and the data cleaning tool 116 can perform the operations requested by the data cleaner 118.

Figure 11:
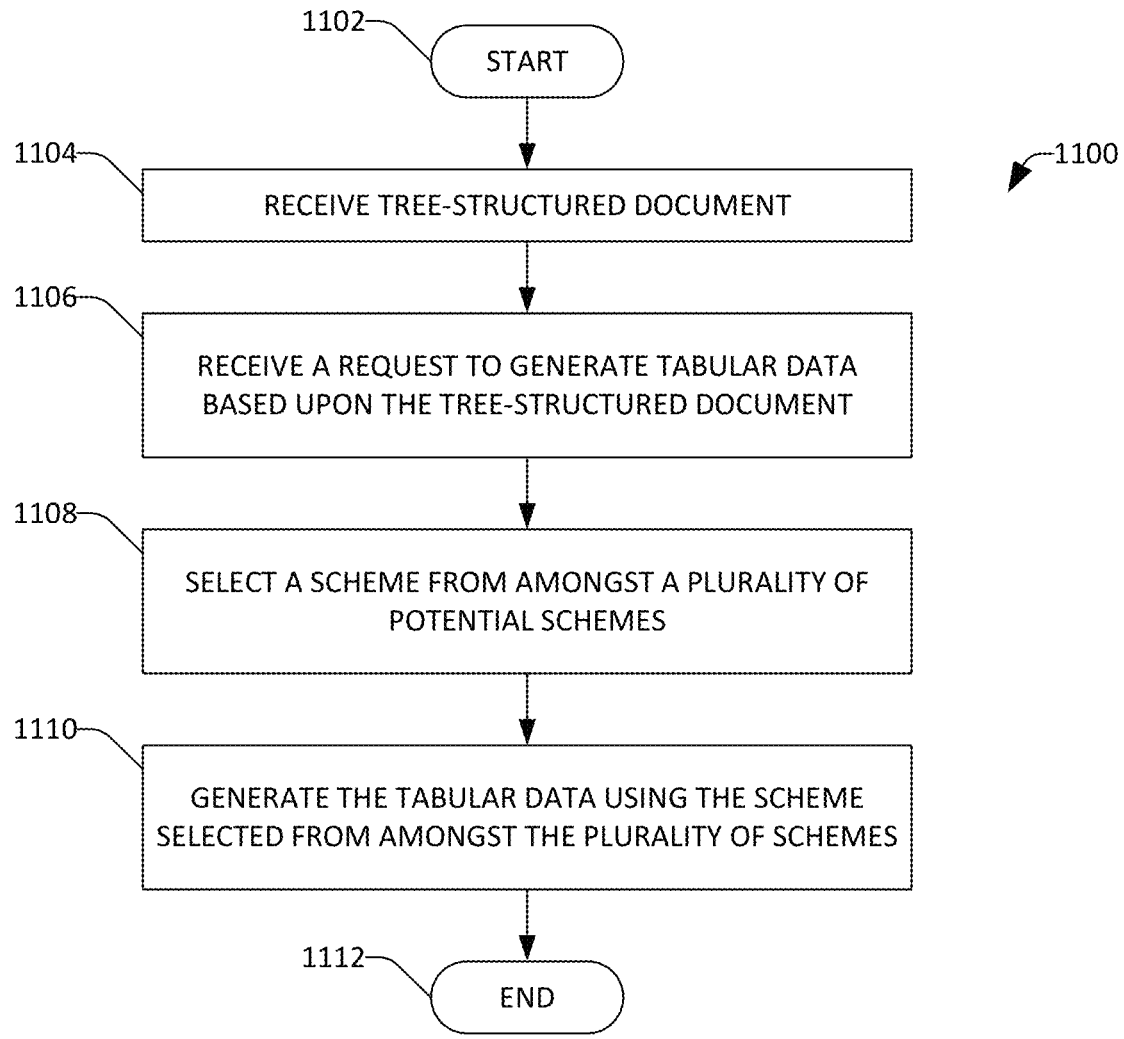
FIG. 11 is a flow diagram that illustrates an exemplary methodology for generating tabular data based upon data extracted from a tree-structured document.
Figure 12:
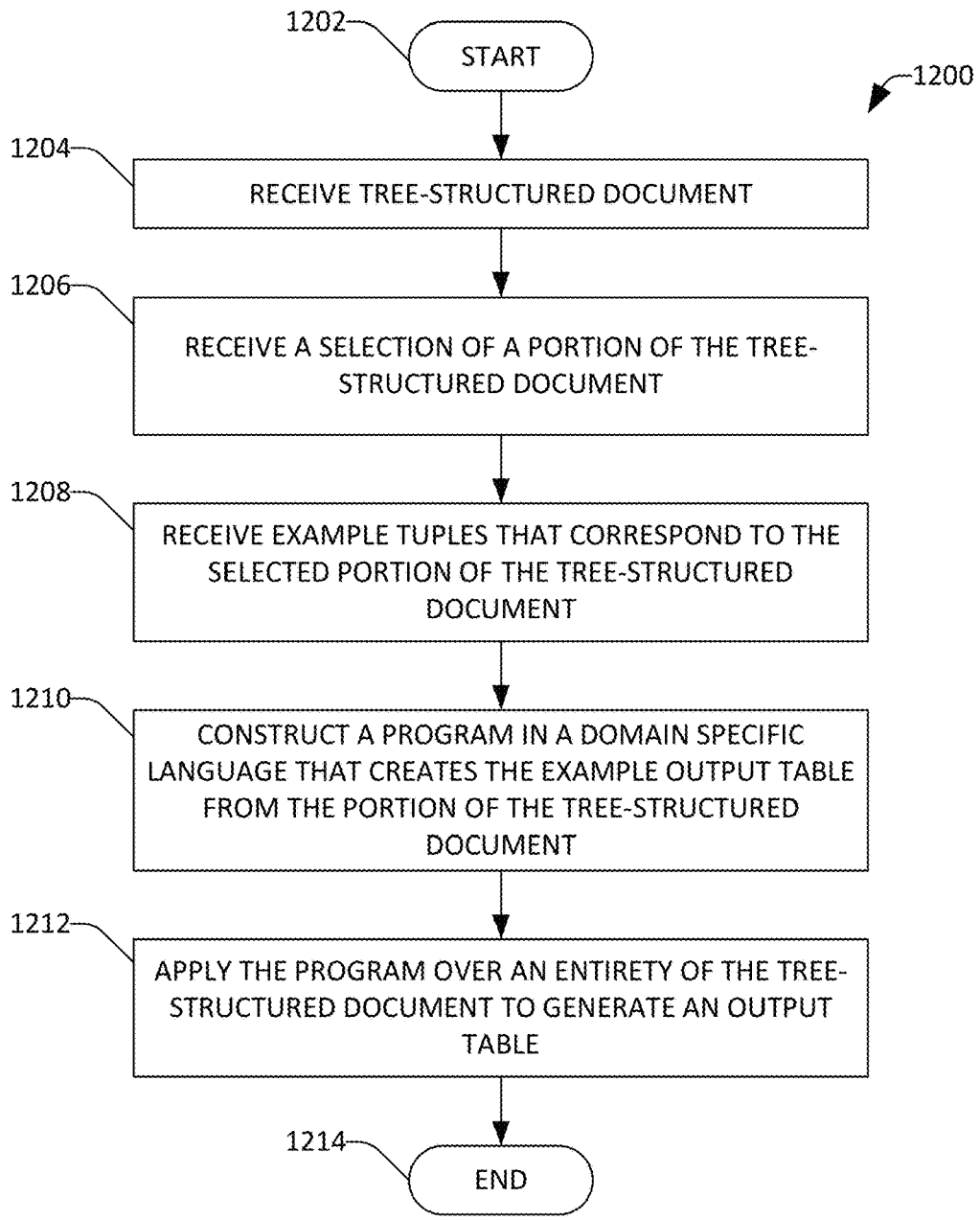
FIG. 12 is a flow diagram that illustrates an exemplary methodology for constructing a program that, when provided with a tree-structured document as input, generates a table as output.

FIGS. 11-12 illustrate exemplary methodologies relating to constructing tables based upon tree-structured documents. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring solely to FIG. 11, an exemplary methodology 1100 that facilitates generating tabular data based upon data extracted from a tree-structured document is illustrated. The methodology 1100 starts at 1102, and at 1104 a tree-structured document is received. For instance, the tree-structured document may be an XML document, a JSON document, or the like. At 1106, a request to generate tabular data based upon the tree-structured document is received. This request may be in the form of the data cleaner 118 causing the data cleaning tool 116 to load the tree-structured document therein.

At 1108, a scheme from amongst a plurality of potential schemes is selected. This scheme can be selected, for instance, based upon a structure of the tree-structured document. As indicated previously, the data cleaning tool 116 can construct a schema based upon a structure of the tree-structured document, and a scheme from amongst the plurality of schemes can be selected based upon the schema. In other examples, the scheme can be selected based upon a model of user behavior, where the model can indicate a format of a resultant output table desired by the data cleaner 118. At 1110, the tabular data is generated using the scheme selected from amongst the plurality of schemes, and the methodology 1100 completes 1112.

With reference now to FIG. 12, an exemplary methodology 1200 that facilitates constructing a table based upon data extracted from a tree-structured document is illustrated. The methodology 1200 starts at 1202, and at 1204 a tree-structured document is received. Again, this tree-structured document may be a JSON document, an XML document, or the like. At 1206, optionally, a selection of a portion of the tree-structured document is received. For example, the data cleaner 118 can define a portion of a tree-structured document that is of interest to the data cleaner 118. At 1208, example tuples are received, wherein the tuples include includes entries that are based upon data in the selected portion of the tree-structured document. The example tuples can include numerous entries. Additionally, while not shown, at 1208, other examples can be received, such as constraints or negative examples.

At 1210, a program is constructed in a domain specific language that is consistent with the example tuples provided by the data cleaner. In other words, when the selected portion of the tree-structured document is provided as input to the program, the program outputs an output table that includes the example tuples. As indicated previously, in some cases, several programs can be constructed that are consistent with the example tuples. These programs can be ranked based upon one or more ranking criteria. Additionally, these programs can be ranked based upon a model of user behavior. At 1212, the program constructed at 1210 is provided with an entirety of the tree-structured document as input, such that the program outputs a table, wherein the table includes the example tuples as a portion thereof. The methodology 1200 completes at 1214.

Figure 13:
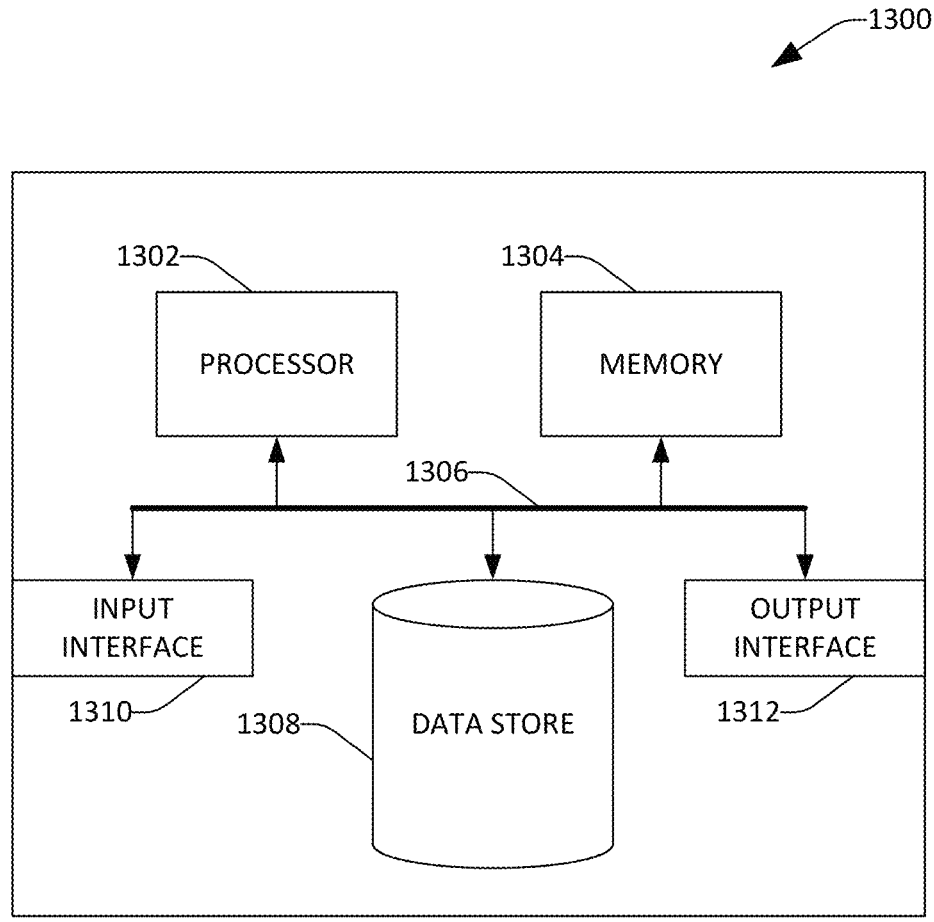
FIG. 13 is an exemplary computing system.

Referring now to FIG. 13, a high-level illustration of an exemplary computing device 1300 that can be used in accordance with the systems and methodologies disclosed herein is illustrated. For instance, the computing device 1300 may be used in a system that is configured to extract data from a tree-structured document and generate a table based upon the extracted data. By way of another example, the computing device 1300 can be used in a system that processes tabular data. The computing device 1300 includes at least one processor 1302 that executes instructions that are stored in a memory 1304. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store tree-structured documents, tables, etc.

The computing device 1300 additionally includes a data store 1308 that is accessible by the processor 1302 by way of the system bus 1306. The data store 1308 may include executable instructions, tree-structured documents, tables, etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc. by way of the output interface 1312.

It is contemplated that the external devices that communicate with the computing device 1300 via the input interface 1310 and the output interface 1312 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1300 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   at least one processor; and
   memory that stores a data cleaning tool, wherein the data cleaning tool, when executed by the at least one processor, is configured to:
   load a tree-structured document into the memory;
   receive a request to generate tabular data based upon the tree-structured document;
   responsive to receiving the request, select a conversion scheme from amongst a plurality of potential conversion schemes, the selected conversion scheme is configured to generate the tabular data when the tree-structured document is received as input to the conversion scheme, wherein the conversion scheme is selected from amongst the plurality of potential conversion schemes based upon historic structure of tabular data in an enterprise division of a user who initiated the request; and
   generate the tabular data based upon the selected conversion scheme.

2. The computing system of claim 1, wherein the conversion scheme is selected from amongst the plurality of potential conversion schemes based upon a computer-implemented model of user behavior with respect to generation of tabular data from tree-structured documents.

3. The computing system of claim 1, the data cleaning tool is further configured to:
   prior to selecting the conversion scheme from amongst the plurality of potential conversion schemes, construct a schema based upon a structure of the tree-structured document; and
   select the conversion scheme from amongst the plurality of potential conversion schemes based upon the constructed schema.

4. The computing system of claim 1, wherein the tree-structured document comprises a first record and a second record, the first record includes a first field and the second record includes a second field, the first field includes a first list and the second field includes a second list of the same length as the first list, and further wherein the selected conversion scheme is configured to merge items in the first list with items in the second list such that a row-based entry in the tabular data includes a first item from the first list and a second item from the second list.

5. The computing system of claim 4, wherein the selected conversion scheme, when applied to the tree-structured document, is configured to merge items from the first list with items the second list that are at the same level in a hierarchy of the tree-structured document.

6. The computing system of claim 1, wherein the tree-structured document comprises a first record and a second record, the first record includes a first field and the second record includes a second field, the first field includes a first list and the second field includes a second list, and further wherein the selected conversion scheme is configured to generate a cross product of the first list and the second list, such that a column in the tabular data includes the cross product of the first list and the second list.

7. The computing system of claim 6, wherein the selected conversion scheme is configured to generate the cross product of the first list and the second list only if the first list and the second list are at a same depth in the tree-structured document.

8. The computing system of claim 1, wherein the tree-structured document is one of a JSON document or an XML document.

9. The computing system of claim 1, the data cleaning tool is further configured to:
   prior to selecting the conversion scheme from the plurality of potential conversion schemes, receive, from a second user, a selection of a portion of the tree-structured document; and
   responsive to receiving the selection of the portion of the tree-structured document and based upon the portion of the tree-structured document, select the conversion scheme from the plurality of potential conversion schemes.

10. A computer-readable storage medium comprising instructions that, when executed by a processor, cause the processor to perform acts comprising:
    loading a JSON document into memory;
    receiving a request to generate tabular data based upon the JSON document;
    responsive to receiving the request, learning a schema for the JSON document based upon a structure of the JSON document;
    using the schema, selecting a conversion scheme from amongst a plurality of possible conversion schemes, wherein the conversion scheme, when receiving the JSON document as input, generates tabular data based upon at least a portion of the JSON document, wherein the conversion scheme is selected from amongst the plurality of potential conversion schemes based upon historic structure of tabular data in an enterprise division of a user who initiated the request; and
    generating tabular data based upon the selected conversion scheme.

11. The computer-readable storage medium of claim 10, wherein the conversion scheme is selected from amongst the plurality of potential conversion schemes based upon a computer-implemented model of user behavior with respect to generation of tabular data from tree-structured documents.

12. A method executed by a processor of a computing system, the method comprising:
    loading a tree-structured document into memory of the computing system;
    receiving a request to generate tabular data based upon the tree-structured document;

responsive to receiving the request, selecting a conversion scheme from amongst a plurality of potential conversion schemes, the selected conversion scheme is configured to generate the tabular data when the tree-structured document is received as input to the conversion scheme, wherein the conversion scheme is selected from amongst the plurality of potential conversion schemes based upon historic structure of tabular data in an enterprise division of a user who initiated the request; and generating the tabular data based upon the selected conversion scheme.

13. The method of claim 12, wherein the conversion scheme is selected from amongst the plurality of potential conversion schemes based upon a computer-implemented model of user behavior with respect to generation of tabular data from tree-structured documents.

14. The method of claim 12, further comprising:
prior to selecting the conversion scheme from amongst the plurality of potential conversion schemes, constructing a schema based upon a structure of the tree-structured document; and
selecting the conversion scheme from amongst the plurality of potential conversion schemes based upon the constructed schema.

15. The method of claim 12, wherein the tree-structured document comprises a first record and a second record, the first record includes a first field and the second record includes a second field, the first field includes a first list and the second field includes a second list of the same length as the first list, and further wherein the selected conversion scheme is configured to merge items in the first list with items in the second list such that a row-based entry in the tabular data includes a first item from the first list and a second item from the second list.

16. The method of claim 15, wherein the selected conversion scheme, when applied to the tree-structured document, is configured to merge items from the first list with items the second list that are at the same level in a hierarchy of the tree-structured document.

17. The method of claim 12, wherein the tree-structured document comprises a first record and a second record, the first record includes a first field and the second record includes a second field, the first field includes a first list and the second field includes a second list, and further wherein the selected conversion scheme is configured to generate a cross product of the first list and the second list, such that a column in the tabular data includes the cross product of the first list and the second list.

18. The method of claim 17, wherein the selected conversion scheme is configured to generate the cross product of the first list and the second list only if the first list and the second list are at a same depth in the tree-structured document.

19. The method of claim 12, wherein the tree-structured document is one of a JSON document or an XML document.

20. The method of claim 12, further comprising:
prior to selecting the conversion scheme from the plurality of potential conversion schemes, receiving, from a second user, a selection of a portion of the tree-structured document; and
responsive to receiving the selection of the portion of the tree-structured document and based upon the portion of the tree-structured document, selecting the conversion scheme from the plurality of potential conversion schemes.

* * * * *